June 5, 1956  O. A. NEALE  2,748,631
TUBE END SHAPING APPARATUS
Filed Feb. 11, 1952

INVENTOR.
Oliver A. Neale
BY
ATTORNEY

United States Patent Office 2,748,631
Patented June 5, 1956

2,748,631
TUBE END SHAPING APPARATUS

Oliver A. Neale, Beaver Falls, Pa., assignor to The Babcock & Wilcox Company, Jersey City, N. J., a corporation of New Jersey Application February 11, 1952, Serial No. 270,930

3 Claims. (Cl. 77—73)

This invention relates to tube end shaping apparatus and, more particularly, to such apparatus including tools simultaneously operating on both the inside and outside diameter, of the tube, as well as on the end face thereof.

In the manufacture of tubing, it frequently happens that the tubing wall is not of uniform thickness throughout. This is of some importance commercially, because tubing is usually sold on a weight basis and the variation in wall thickness results in a corresponding variation in weight per unit length of the tubing. However, there is a more serious factor involved in that the inner and outer diameters are not concentric which makes it difficult to properly form a uniformly shaped double bevelled end on the tubing for subsequent welding or the like.

These considerations are particularly applicable to the manufacture of seamless tubing, wherein a rapidly rotating heating billet is pierced by a mandrel to form the billet into a tube. It is very difficult to maintain the inner and outer diameters of the tubing concentric in this process, due to the flow or displacement of metal as a result of the forming operation.

The present invention provides a novel tube and shaping apparatus in which uniformly related inside and outside bevels, and a finished end face, are simultaneously formed on a tube end. This is effected by holding the tube with one surface accurately centered with respect to the axis of a rotating tool holder or spindle carrying a fixed chamfering tool operable on such surface. The tool holder or spindle carries a second chamfering tool operable on the other tube surface and this latter tool has a floating, preferably self-centering mounting relative to the fixed tool so that it may automatically center itself relative to the fixed tool. An end facing tool is fixedly mounted in the spindle for dressing the end face of the tube.

Preferably, the tube is clamped with its outside surface accurately centered on the spindle axis, and the spindle fixedly carries an outside diameter bevelling tool. A double edged, substantially triangular inside diameter bevelling tool has a self-centering floating mount in the spindle and on the axis of the latter. The edge facing tool is fixed in the spindle.

In a preferred arrangement, the spindle is a cylindrical member having an axially extending slot which receives a plate-like support to which is pivotally connected a spring biased plate-like inside diameter chamfering tool, the walls of the slot acting to transmit the driving force to the tool. The spindle has two substantially radial slots extending from the axial slot, each being substantially rectangular in cross section and having one edge co-extensive with the radius. One of these slots receives a trapezoidal shaped plate-like member having an angularly disposed cutting edge to form outside bevel. The other slot receives a substantially rectangular plate-like member having a radially extending cutting edge to form the end face on the tube. The outside diameter chamfering tool and the end facing tool are driven by the force transmitted from the walls of the slots to the tools. In operation, all three tools operate simultaneously on the tube end.

For an understanding of the invention principles, reference is made to the following description of a typical embodiment thereof as illustrated in the accompanying drawing.

Figure 1:
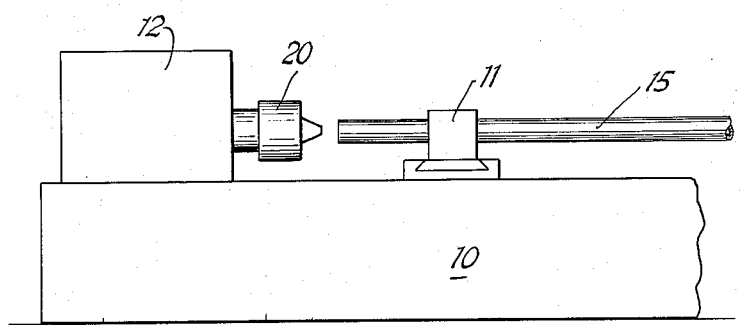
Fig. 1 is a side elevation view of apparatus embodying the invention.

Referring to Fig. 1, the invention tube end shaping apparatus is mounted on a relatively heavy base 10 and includes tube gripping means 11 arranged to clamp on the outside surface of a tube 15, and to hold this outside surface accurately concentric with the axis of rotation of a spindle 20 driven by suitable mechanism indicated at 12. Grip means 11 is mounted for longitudinal adjustment to bring the end of tube 15 into operative relation with tools mounted in spindle 20, the adjustment means being conventional in tube end shaping apparatus and thus not deemed necessary to be illustrated.

Figure 2:
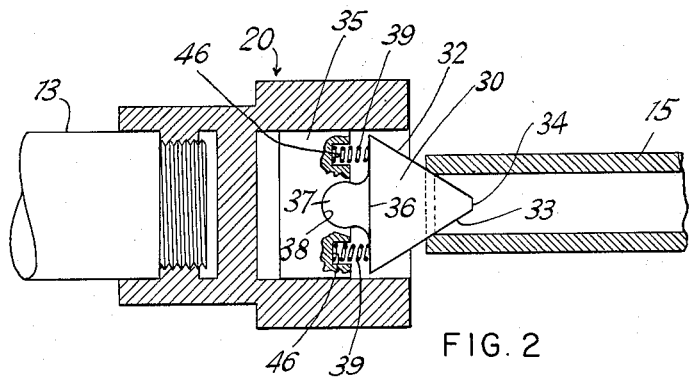
Fig. 2 is a substantially axial sectional view through the spindle, taken on the line 2—2 of Fig. 4.
Figure 3:
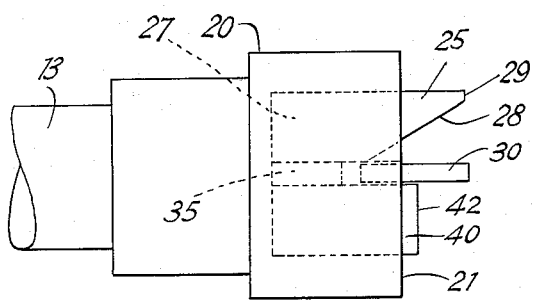
Figs. 3 and 4 are side and end elevation views, respectively, of the spindle and the tools supported therein.
Figure 4:
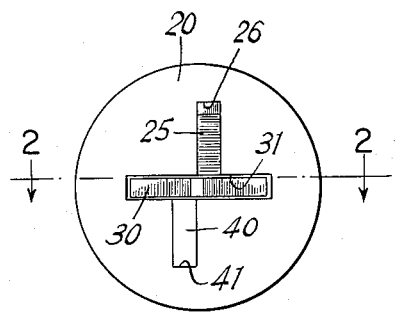
Figure 5:
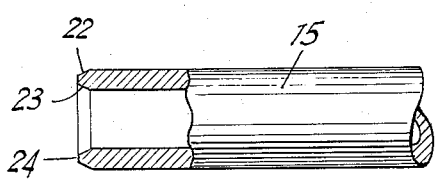
Fig. 5 is an elevation view, partly in section, illustrating the finished tube end.

Referring to Figs. 2 through 4, spindle 20 is secured in suitable fashion upon the end of a drive shaft 13 which is rotated by mechanism 12 and projects from the housing of the latter. The spindle is generally cylindrical in shape, and is arranged to support an outside diameter chamfering tool 25, an inside diameter chamfering tool 30, and an end facing tool 40, all three of which operate simultaneously on the tube end. For this purpose, spindle 20 is formed with an axial slot 31, substantially rectangular in cross section, and centered on a diameter of the spindle. A substantially radial slot 26 extends perpendicularly to and intersects slot 31, slot 26 likewise being substantially rectangular in cross section but having one longitudinal edge co-extensive with a radius of the spindle. A second radial slot 41 extends in the opposite direction from, and intersects, slot 31, this slot 41 also being substantially rectangular in cross section and having one longitudinal edge co-extensive with a radius of the spindle.

Outside diameter chamfering tool 25 is fixed relative to the axis of spindle 20. Tool 25 is substantially trapezoidal in cross section, having a rectangular portion 27 fitting snugly in slot 26, with a triangular portion at least partially projecting from the face 21 of spindle 20 and including a cutting edge 28 extending at an angle to the spindle axis and a blunt forward edge 29.

The inside diameter chamfering tool 30 is mounted in spindle 20 with a self-centering floating mount relative to the spindle axis. Tool 30 includes a substantially rectangular plate-like tool holder 35 having a snug fit in slot 31. The tool itself is substantially triangular in plan, having cutting edge 32 and 33 extending at equal angles to the altitude of the triangle. Edges 32 and 33 are joined by a relatively blunt nose 34 at their forward ends, and by a base 36 at their rear ends. Base 36 has a circular trunnion 37 projecting centrally therefrom and mounted within a circular socket 38 in the forward edge of holder 35. Springs 39—39 rest in sockets 46—46 in the forward edge of holder 35 on either side of socket 38, and these springs engage the base 36 on either side of trunnion 37. The springs are substantially equal in strength and normally tend to bias tool 30 to a centered position relative to the axis of spindle 20. Thereby, when tube 15 is moved into engagement with the tool 25, the spindle 20 being rotated, the tool 30 will tend to automatically center itself relative to the outside surface of tube 15.

The edge or end facing tool 40 is a plate-like rectangle having a snug fit in slot 41 and projecting a predetermined distance forwardly of face 21 of spindle 20. Tool 40 has a radially extending cutting edge 42.

The apparatus is easily assembled by first placing tool holder 35 and tool 30 combination into slot 31. It should be noted that tool 30 is somewhat thinner than holder 35, its transverse dimensions being less than those of slot 31 to provide for full freedom of movement of tool 30 relative to the slot. After the inside diameter chamfering tool is in position, the outside diameter chamfering tool 25 and the edge facing tool 40 are placed in their respective slots 26 and 41.

Driving mechanism 12 is then energized to rotate spindle 20, and grips 11 are advanced to bring the end of tube 15 into engagement with the tools mounted in spindle 20. The tools are driven by the force transmitted from the walls of the respective slots to the tools mounted in the slots. The tool 25 forms an accurately centered outside bevel 22 on the tube end, and the tool 30, due to its self-centering floating mounting, forms an inside bevel 23 on the tube end centered relative to outside bevel 22. The tool 40, whose cutting edge 42 extends at right angles to the spindle axis, forms a shaped end 24 on tube 15, this shaped end being accurately normal to the axis of the tube.

In the specific example selected to illustrate the invention, the outside diameter chamfering tool has been indicated as fixed relative to the spindle axis, with the inside diameter chamfering tool having a floating self-centering mounting relative to the spindle axis. However, by a change in the type of tube gripping means used, to accurately center the inner surface of the tube relative to the spindle axis, the inside diameter chamfering tool may have a fixed mounting and the outside diameter chamfering tool have a floating tool.

While a specific embodiment of the invention has been shown and described in detail to illustrate the application of the invention principles, it will be understood that the invention may be otherwise embodied without departing from such principles.

I claim:

1. Tube end shaping apparatus comprising, in combination, a rotatable chuck constructed and arranged to be secured to driving means and having a slot therein in an axial plane; a substantially rectangular plate-like tool holder having a snug fit in said slot; a substantially triangular plate-like inside diameter chamfering tool having its base portion extending partially into said slot and having cutting edges on the sides of the triangle and a trunnion projecting from the triangle base and pivotally engaged in said tool holder, the triangle being substantially co-planar with said tool holder and rockable in an axial plane; and a pair of resilient means disposed between the outer edge of the tool holder and the triangle base on either side of the trunnion biasing said inside diameter chamfering tool to a position centered on the spindle axis; said tool having a thickness slightly less than the distance between the longer sides of the slot to provide play for the tool axially of the trunnion.

2. Tube end shaping apparatus comprising, in combination, a rotatable chuck constructed and arranged to be secured to driving means and having a first slot therein in an axial plane, and a second slot extending outwardly from said first slot and parallel and contiguous to a radius; a substantially rectangular plate-like tool holder having a snug fit in said first slot; a substantially triangular plate-like inside diameter chamfering tool having its base portion extending partially into said first slot and having cutting edges on the sides of the triangle and a trunnion projecting from the triangle base and pivotally engaged in said tool holder, the triangle being substantially co-planar with said tool holder and rockable in an axial plane; a pair of resilient means disposed between the outer edge of the tool holder and the triangle base on either side of the trunnion biasing said inside diameter chamfering tool to a position centered on the spindle axis; and an outside diameter chamfering tool inserted in said second slot; said tool having a thickness slightly less than the distance between the longer sides of said first slot to provide play for the tool axially of the trunnion.

3. Tube end shaping apparatus comprising, in combination, a rotatable chuck constructed and arranged to be secured to driving means and having a first slot therein in an axial plane, a second slot extending outwardly from said first slot and parallel and contiguous to a radius, and a third slot extending outwardly from said first slot and parallel and contiguous to a radius, said second and third slots extending in opposed directions from said first slot; a substantially rectangular plate-like tool holder having a snug fit in said first slot; a substantially triangular plate-like inside diameter chamfering tool having its base portion extending partially into said first slot and having cutting edges on the sides of the triangle and a trunnion projecting from the triangle base and pivotally engaged in said tool holder, the triangle being substantially co-planar with said tool holder and rockable in an axial plane; a pair of resilient means disposed between the outer edge of the tool holder and the triangle base on either side of the trunnion biasing said inside diameter chamfering tool to a position centered on the spindle axis; an outside diameter chamfering tool inserted in said second slot; and an edge facing tool inserted in said third slot; said tool having a thickness slightly less than the distance between the longer sides of said first slot to provide play for the tool axially of the trunnion.

References Cited in the file of this patent

UNITED STATES PATENTS

| 1,053,531 | Platt | Feb. 18, 1913 |
| 1,204,994 | Kendall | Nov. 14, 1916 |
| 1,499,416 | Stech | July 1, 1924 |
| 2,187,221 | Brown | Jan. 16, 1940 |
| 2,539,863 | Rusnov | Jan. 30, 1951 |

FOREIGN PATENTS

| 608,157 | Great Britain | Sept. 10, 1948 |